(12) United States Patent
Tress et al.

(10) Patent No.: US 9,818,559 B2
(45) Date of Patent: Nov. 14, 2017

(54) WIRELESS LIGHTING CONTROL DEVICE

(71) Applicant: Rev-A-Shelf Company, LLC, Louisville, KY (US)

(72) Inventors: Christopher Michael Tress, Louisville, KY (US); Stephen A Warden, Louisville, KY (US)

(73) Assignee: Rev-A-Shelf Company, LLC, Louisville, KY (US)

( * ) Notice: Subject to any disclaimer, the term of this patent is extended or adjusted under 35 U.S.C. 154(b) by 0 days.

(21) Appl. No.: 15/000,178

(22) Filed: Jan. 19, 2016

(65) Prior Publication Data

US 2017/0207042 A1 Jul. 20, 2017

(51) Int. Cl.
*H01H 23/04* (2006.01)
*H05B 37/02* (2006.01)

(52) U.S. Cl.
CPC ......... *H01H 23/04* (2013.01); *H05B 37/0272* (2013.01)

(58) Field of Classification Search
CPC .. H01H 21/00; H01H 23/00; H01H 2221/016; H01H 2001/0047; H01H 1/54; H01H 1/545
USPC ................ 335/106, 127–128; 362/285–286; 200/61.45 R, 404; 248/205.1, 206.5, 248/309.1, 309.4
See application file for complete search history.

(56) References Cited

U.S. PATENT DOCUMENTS

| | | | | |
|---|---|---|---|---|
| 4,296,394 A * | 10/1981 | Ragheb | ..................... | H01H 5/02 200/404 |
| 4,489,297 A * | 12/1984 | Haydon | ............. | H01H 36/0073 200/404 |
| 8,389,857 B2 * | 3/2013 | Petrillo | .............. | H05B 37/0272 174/50 |
| 8,570,126 B1 * | 10/2013 | Lee | ...................... | H01H 23/025 335/205 |
| 8,796,567 B2 * | 8/2014 | Mahle | ..................... | G04F 3/025 200/33 R |
| 9,589,461 B1 * | 3/2017 | Byrne | ..................... | G08C 19/00 |
| 2003/0067371 A1 * | 4/2003 | Van Zeeland | ............ | H01H 5/02 335/78 |

(Continued)

OTHER PUBLICATIONS

Tresco Lighting—FreeDIM Series Wireless Controllers, dated Nov. 2015, pp. 161, Tresco Lighting Catalog, www.trescolightinq.com.

(Continued)

*Primary Examiner* — Jason M Crawford
(74) *Attorney, Agent, or Firm* — Brinks Gilson & Lione

(57) ABSTRACT

A light switch includes an outer housing formed with a plurality of intersecting walls to define a recess and including a first ferromagnetic material. The outer housing is configured to be coupled with an external structure by a plurality of mounting brackets integrally formed as part of the outer housing and extending outwardly therefrom. The light switch also includes an inner housing. The inter housing includes a user controllable switch mechanism and a second ferromagnetic material. At least one of the first ferromagnetic material and the second ferromagnetic material comprises a permanent magnet, and the inner housing is sized to be received and removably maintained in the recess formed in the outer housing by magnetic attraction between the first ferromagnetic material and the second ferromagnetic material.

21 Claims, 7 Drawing Sheets

(56) References Cited

U.S. PATENT DOCUMENTS

| | | | | |
|---|---|---|---|---|
| 2011/0272261 A1* | 11/2011 | Johnson | .................. | H01H 23/02 |
| | | | | 200/339 |
| 2012/0104197 A1* | 5/2012 | Jensen | .................. | F16M 13/02 |
| | | | | 248/205.1 |
| 2014/0015596 A1* | 1/2014 | Martin | .................. | H03K 17/97 |
| | | | | 327/517 |
| 2014/0368322 A1* | 12/2014 | Mullet | .................. | G08C 17/02 |
| | | | | 340/12.5 |
| 2015/0189726 A1* | 7/2015 | Spira | .................. | H05B 33/0845 |
| | | | | 315/302 |
| 2015/0228426 A1* | 8/2015 | Romano | .................. | H01H 3/22 |
| | | | | 200/331 |

OTHER PUBLICATIONS

Quattro 4 zone LED Controller, Specification Sheet, Part No. RAZ-Q4RF, Receiver: RAZ-WR96, dated at least as early as Dec. 31, 2014, pp. 1, www.razorled.net, © RAZORLED Inc. 2014.

UNO Single Zone LED Control + Receiver Set, RAZ-UNO72W; dated at least as early as Dec. 11, 2015, pp. 1-3, URL: http://222.razorled.net/product-p/raz-uno72w.htm.

* cited by examiner

WIRELESS LIGHTING CONTROL DEVICE

FIELD

The present disclosure relates generally to a lighting control device, and more particularly to a wireless lighting control device.

BACKGROUND

Lighting systems are frequently controlled with a switch to supply power to one or more light fixtures. The switch can directly supply power to the light fixtures, or can provide an input to a lighting controller that energizes and de-energizes the light fixtures in accordance with signals received from the switch. Light emitting diodes (LEDs) and light strips can be used in lighting systems, and can be controlled with a switch.

SUMMARY

Further areas of applicability will become apparent from the description provided herein. It should be understood that the description and specific examples are intended for purposes of illustration only and are not intended to limit the scope of the present disclosure.

A wireless lighting control device includes a removeable inner housing that is useable as a wireless remote control for a lighting system. The inner housing is magnetically maintained in a predetermined position in an outer housing. The outer housing can be fixedly mounted to any external structure. The inner housing is readily removeable by a user from the outer housing by manual disengagement of magnetic attraction between the outer housing and the inner housing. The inner housing includes an ergonomic design to accommodate ease of removal from the outer housing, to comfortably fit a hand of a user, and to provide convenient and comfortable capability to manually change lighting levels in a lighting system within which the inner housing wireless communicates.

An example of a wireless lighting control device can include an inner housing and an outer housing. The inner housing can include an enclosure forming a back and sides of the inner housing, and a user controllable switch forming a front surface of the inner housing. The enclosure can include a wireless transmitter and a light control switch. The outer housing can include a floor and intersecting walls, which form an aperture to receive the inner housing such that the back and sides of the inner housing are positioned within the outer housing in respective alignment with the floor and walls, and the front surface of the inner housing protrudes to extend outwardly from the aperture away from the outer housing. A permanent magnet can be included in at least one of the inner housing or the outer housing, and a ferromagnetic member can be included in at least one of the inner housing and the outer housing such that the permanent magnet or the permanent magnet and the ferromagnetic member attractively maintain the inner housing in the aperture and magnetically adhered to the outer housing.

Another example of a wireless lighting control device can include an inner housing and an outer housing. The outer housing can include a first ferromagnetic member, a floor, a first pair of opposed perimeter walls extending perpendicular to the floor, and a second pair of opposed perimeter walls extending perpendicular to the floor. The first pair of perimeter walls can intersect the second pair of perimeter walls perpendicularly to define a rectangular cavity. The rectangular cavity can include a plurality of corners formed by the perimeter walls and the floor. Each of the corners can have a predetermined radius of curvature.

The inner housing can include a rectangular enclosure and a user controllable switch cover. The rectangular enclosure can include a second ferromagnetic member. At least one of the first ferromagnetic member and the second ferromagnetic member is a permanent magnet. The rectangular enclosure can be formed with rounded corners having the predetermined radius of curvature of the corners included in the outer housing so that the rounded corners of the inner housing are alignable in the rectangular cavity with the corners of the outer housing. The inner housing can be magnetically held in a predetermined removable position within the outer housing by the first and second ferromagnetic members.

An interesting aspect of the wireless lighting control device relates to a planar floor surface of one of the outer housing or the inner housing that includes a lug, and an other of the planar floor surface of the outer housing or the inner housing includes a keeper sized to receive and engage the lug. In an example system, the inner housing can be received and removably maintained in the recess by alignment of first and second ferromagnetic materials only when the floor of the inner housing and the floor of the outer housing are aligned in parallel by the lug being engaged with the keeper.

Another interesting aspect of the wireless lighting control device relates to a user controllable switch mechanism that includes a moveable front planar face extending to a periphery of the recess formed in the outer housing when the inner housing is received and removably maintained in the outer housing. The front planar face is a user interface and defines an outer perimeter edge of the inner housing.

Other systems, methods, features and advantages will be, or will become, apparent to one with skill in the art upon examination of the following figures and detailed description. It is intended that all such additional systems, methods, features and advantages be included within this description, be within the scope of the invention, and the following claims.

DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
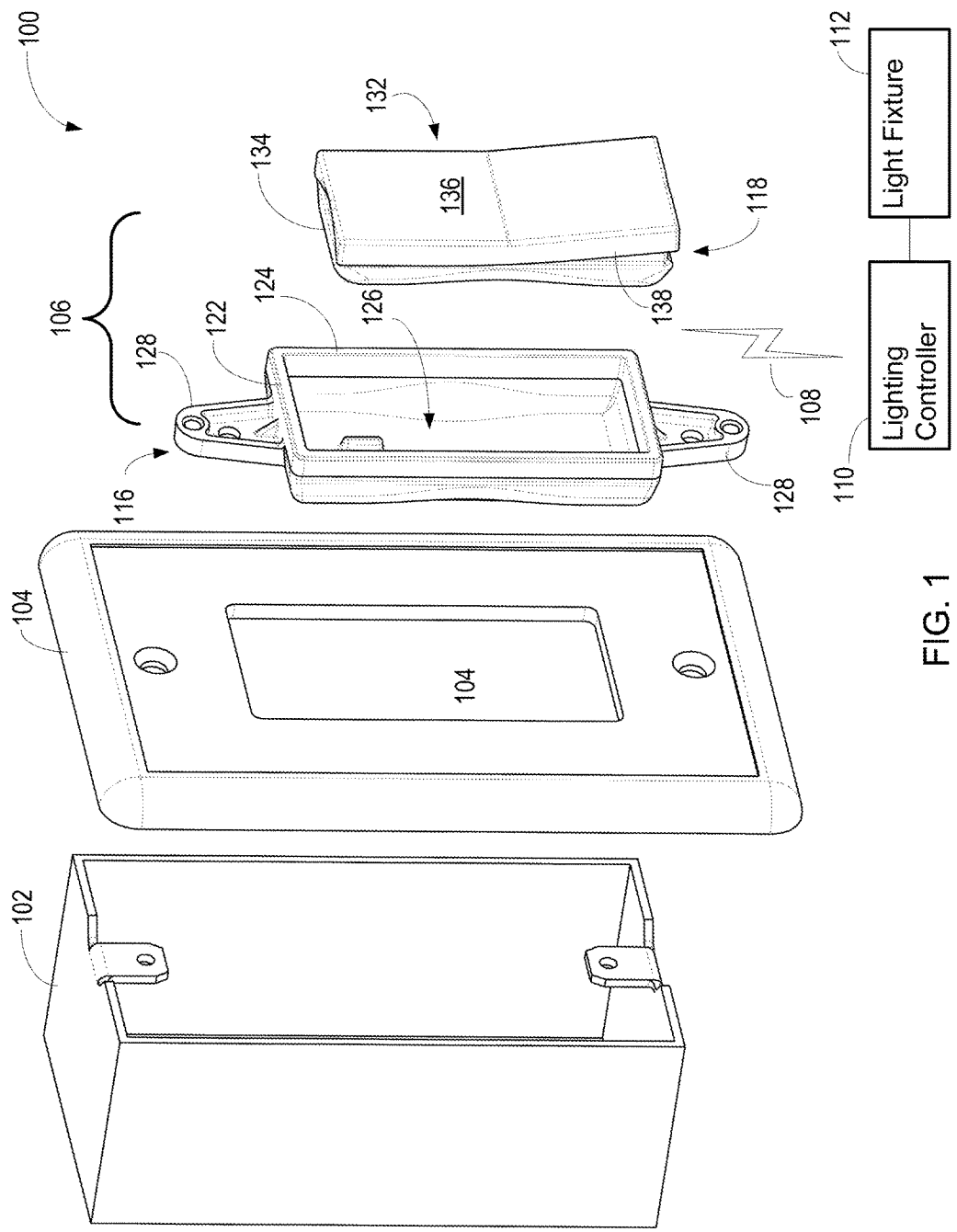
FIG. 1 is an exploded perspective view illustrating an example of a wall box, a mounting plate and a lighting system.

Referring to FIG. 1, an example of a lighting system 100 is shown. Also illustrated is an example of external structures in the form of a wall box 102 and a mounting plate 104. The wall box 102 and mounting plate 104 are illustrated as one of a number of different external structures within or on which a wireless lighting control device 106 included in the lighting system 100 can be installed. In other examples, the wireless lighting control device 106 can be wall mounted, surface mounted, mounted behind and extending through a panel such as a drywall or wood panel, and/or mounted in any other form of external structure.

During operation of the lighting system 100, wireless signals 108 can be communicated from the wireless lighting control device 106 to a lighting controller 110 to control energization or de-energization of one or more light fixtures 112. The wireless signals 108 can be short range or long range wireless signals, and can be a proprietary protocol, or standard communication protocol, such as Bluetooth®, IEEE 802.11, or any other wireless communication protocol. The lighting controller 110 can be any form of device or system capable of controlling a supply of power to the one or more light fixtures 112. Thus, the controller 110 can include voltage regulation, voltage conversion, and/or monitoring, as well as providing dimming and on/off functionality to the light fixture 112. The light fixture 112 can be any form of electrically powered device capable of emitting lumens of light energy, such as LED, neon, fluorescent, incandescent, high intensity discharge (HID), or any other form of electrically powered light emitting device.

At least two different wireless control signals 108 can be wirelessly provided to the lighting controller 110 to control one or more light fixtures 112. For example, a first wireless control signal may be provided to a lighting controller 110 to instruct the controller 110 to energize and/or increase the lumen output of one or more light fixtures 112, and a second wireless control signal can be provided to instruct the controller 110 to deenergize and/or decrease the lumen output of one or more light fixtures 112. In other examples, any other control signals and/or feedback signals may be communicated as wireless signals 108.

The wireless lighting control device 106 can include an outer housing 116 and an inner housing 118. The outer housing 116 can be integrally formed as a single unitary structure in a formable rigid material such as plastic. In an example, the outer housing 116 and the inner housing 118 are both made of a non-conducting material, such as plastic, so that any inadvertent contact with a power source would not cause energization of the outer housing 116 or the inner housing 118.

The outer housing 116 may be formed with intersecting walls 122 and 124 to define a recess 126. The walls 122 can be a pair of opposing perimeter walls that intersect with the walls 124, which are also a pair of opposing perimeter walls to form the recess 126 as rectangular. In addition, the outer housing 116 can include mounting brackets 128 integrally formed as part of the outer housing 116 and extending outwardly from outer housing 116. The mounting brackets 128 can be used to couple the outer housing 116 to an external structure, such as the wall box 102 and/or the mounting plate 104.

Figure 2:
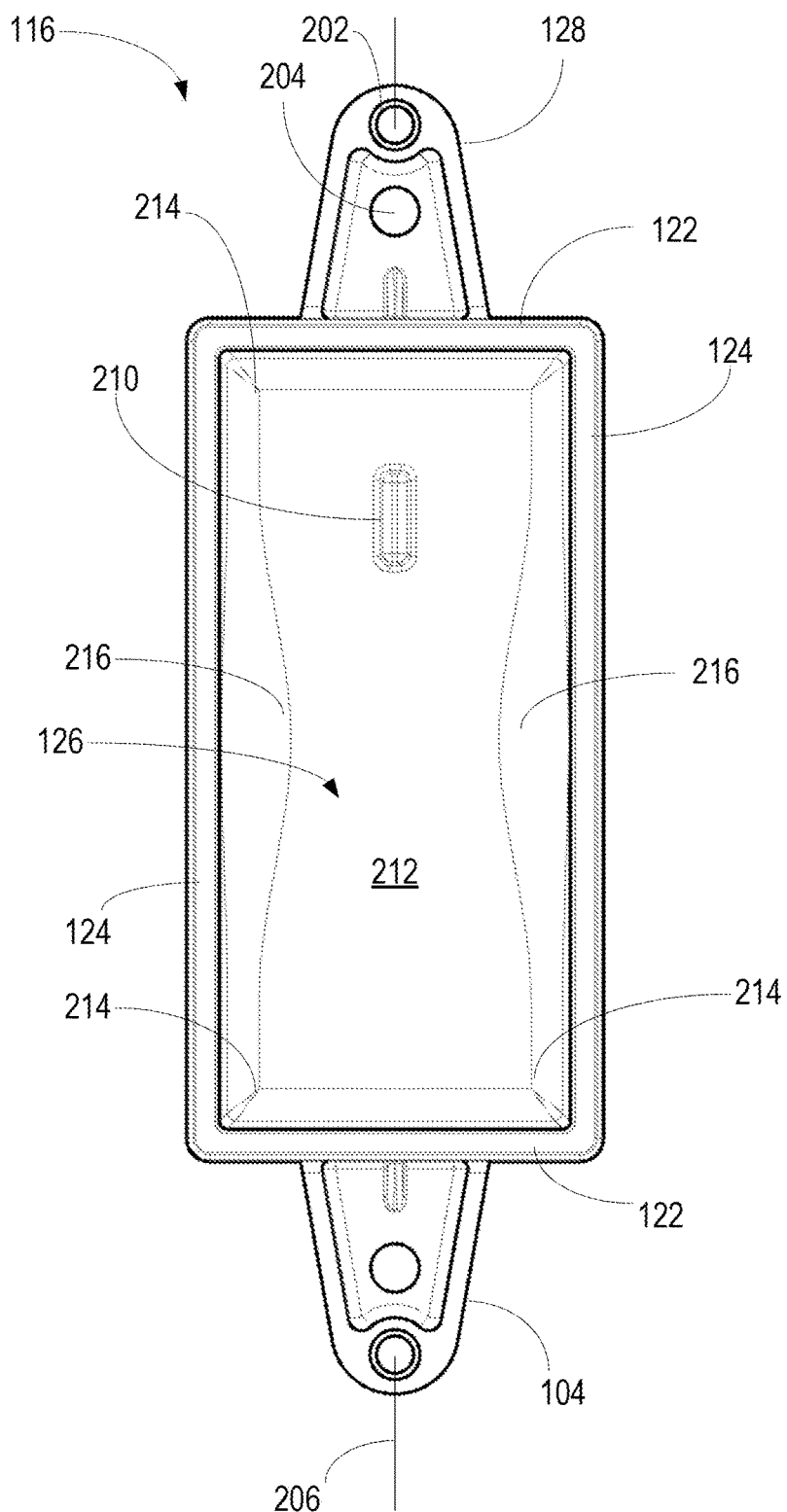
FIG. 2 is a plan view of an example of an outer housing of a wireless lighting control device.

FIG. 2 is a plan view of an example of an outer housing 116 that includes the mounting brackets 128 and the intersecting walls 122 and 124 forming the recess 126, which can also be described as an aperture 126 in the outer housing 116. The mounting brackets 128 can be formed to include apertures, such as a first aperture 202 and a second aperture 204. The first aperture 202 and the second aperture 204, and the mounting brackets 128 can be aligned along a central axis 206 of the outer housing 116. The first aperture 202 can be formed in the mounting bracket 128 to align with a coupling mechanism in an external structure such as a wall box 102, and the second aperture 204 can be formed in the mounting bracket 128 to align with a coupling mechanism in another external structure, such as a face plate 104. Thus, a fastener, such as a screw, can be inserted through one or both of the apertures 202 or 204 and be coupled with a coupling mechanism in the external structure.

The outer housing 116 can also include a lug or a keeper 210 formed in a floor 212 of the outer housing 116. When the outer housing 116 is formed to include the lug 210, the floor 212 is formed to include a protuberance of predetermined dimensions extending into the recess 126. The lug 210 can be sized to engage a corresponding keeper or aperture of predetermined dimensions formed or included in an outer surface of the inner housing 118. Alternatively, where the outer housing 116 is formed to include the keeper 210, the floor 212 is formed to include the keeper in form of an aperture of predetermined dimensions in order to receive and engage a lug formed in an outer surface of the inner housing 118.

The floor 212 is a planar surface extending to the intersecting walls 122 and 124 such that the walls 122 and 124 form a perimeter around the floor 212 and extend perpendicularly away from the floor 212. The floor 212 and the intersecting walls 122 and 124 define the recess 126. In the illustrated example, the first pair of opposed perimeter walls 122 extending perpendicular to the floor 212, and the second pair of opposed perimeter walls 124 extending perpendicular to the floor 212 such that the first pair of perimeter walls 122 intersects the second pair of perimeter walls 124 perpendicularly to define the recess 126 as a rectangular cavity. The intersection of the walls 122 with the walls 124 form corners 214 in the outer housing 116. Each of the corners 214 can have a predetermined radius of curvature. In addition, the walls 124 can include a surface contour 216 that has a predetermined radius of curvature. The surface contour 216 can result an ergonomic design conducive to handling by a user. In addition, the surface contour 216 can result in a portion of the walls 124 being substantially perpendicular to the floor 212 and the floor 212 having an hourglass shape, as illustrated in FIG. 2.

Figure 3:
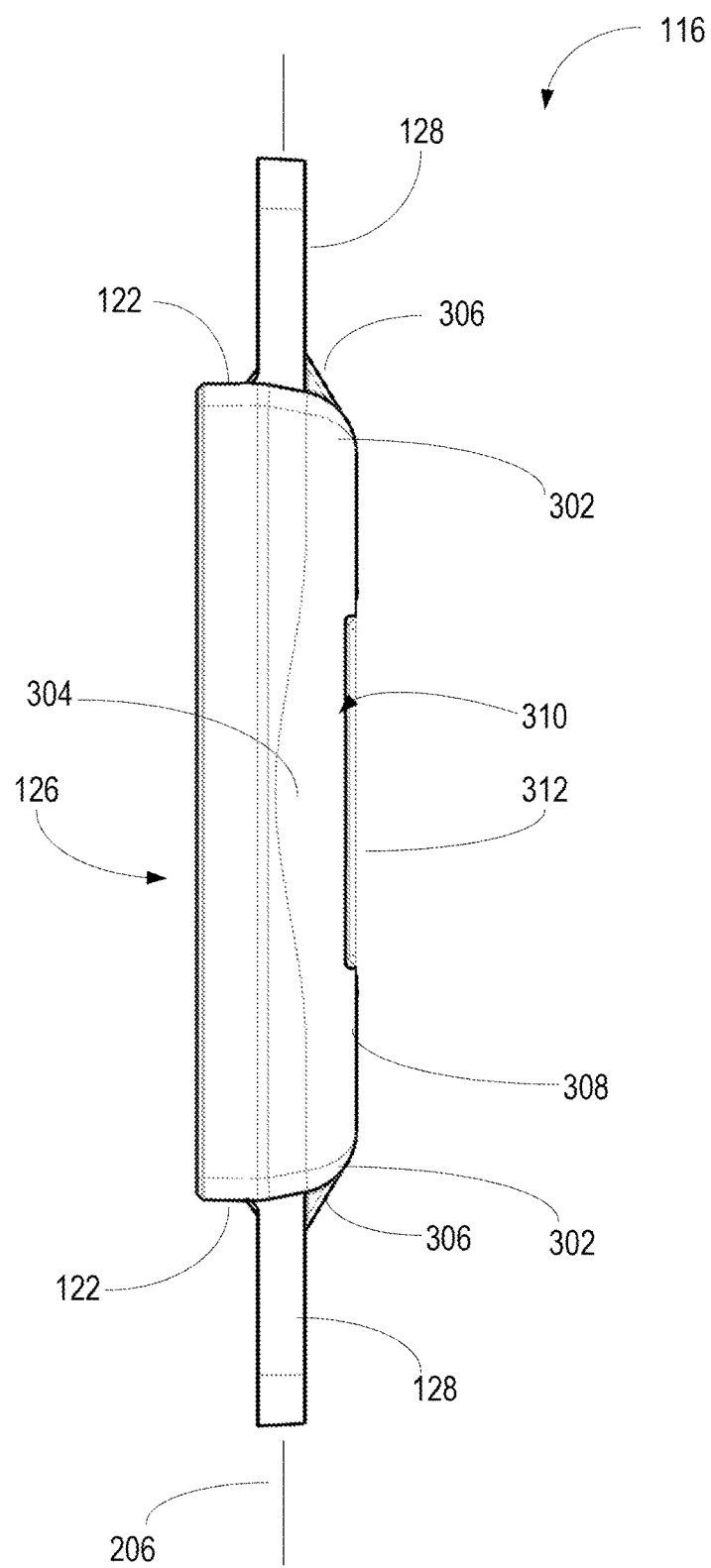
FIG. 3 is a side view of an example of an outer housing of a wireless lighting control device.

FIG. 3 is a side view of an example of the outer housing 116 that illustrates the mounting bracket 128 extending longitudinally away from the outer surface of the walls 122. An outer surface of the outer housing 116 can be formed to include outer rounded corners 302 corresponding to and having the same predetermined radius as the corners 214. In addition, the outer surface of the outer housing 116 can include inwardly curved extending rounded edges 304 with a portion of the outer surface being formed with a radius of curvature corresponding to the radius of curvature of the walls 124 that form the hourglass shape in the floor 212.

In FIG. 3, the mounting brackets 128 are formed at opposing ends of the outer housing 116 on the central axis 206 of the outer housing 116. In addition, the mounting brackets 128 can be centrally positioned on the walls 122 to extend therefrom such that mounting brackets 128 are spaced away from a plane formed by a surface of a back side 308 of the outer housing 116 and a plane formed by the front surface of the outer housing 116. The brackets 128 can be centrally positioned on the walls 122 to allow dual purpose mounting, such as behind a wall or other surface and protruding therethrough, on a surface, or in an enclosure such as a wall box. In some examples, the mounting brackets 128 may be held in position with supports 306 formed to extend between the mounting brackets 128 and the surface of the walls 122. The supports 306 may be integrally formed as part of the outer housing 116.

Figure 4:
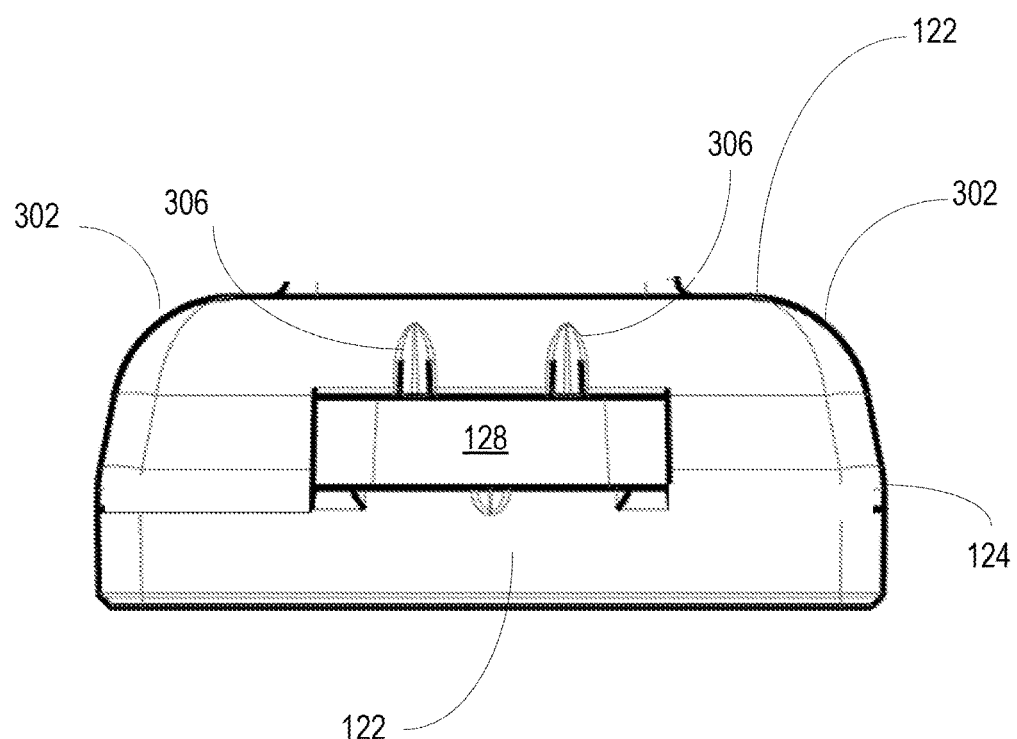
FIG. 4 is an end view of an example of an outer housing of a wireless lighting control device.

FIG. 4 is an end view of an example of the outer housing 116 that is illustrated to include the mounting bracket 128 and the supports 306, which are coupled with the wall 122. FIG. 4 also illustrates the outer round corners 302 corresponding to the corners 214 formed in the aperture 126. As illustrated in FIG. 4, the mounting bracket 128 can be centrally positioned on the walls 122 between the front and back faces of the outer housing 116.

Referring again to the example of FIG. 3, the back side 308 of the outer housing 116 can be a planar surface opposite the planar surface of the floor 212. (FIG. 2) The back side 308 can be formed to include an aperture 310. The aperture 310 can be integrally formed in the back side 308 and sized to receive a ferromagnetic member 312. The ferromagnetic member 312 can be fixedly held in the aperture 310 by friction fit, adhesive, and/or any other mechanism to fixedly couple the ferromagnetic member 312 to the outer housing 116. In examples implementations where the outer housing 116 is formed of a non-conducting material, such as plastic, the ferromagnetic member 312 is fixedly held in the aperture 310 to be isolated from ground or any other conducting material so that any inadvertent contact by the ferromagnetic member 312 with an energy source will not result in energization of the outer housing 116. Thus, in an example where the wireless lighting control device is mounted in an enclosure or other location adjacent to a source of power, neither the ferromagnetic material 312 nor the outer housing 116 will become a conductor of electricity. In alternative examples, the outer housing 116 may be molded or formed to surround the ferromagnetic member 312, and/or may otherwise include a ferromagnetic material integrally therein such that the aperture 310 can be omitted. In such alternative examples, the outer housing 116 can otherwise be formed of non-conducting material to avoid being a conductor of electricity.

The ferromagnetic member 312 can be any material, such as iron, nickel or cobalt that is attracted to a magnetic field. Alternatively, or in addition, the ferromagnetic member 312 can be a permanent magnet. The ferromagnetic member 312 can be used to magnetically couple the outer housing 116 and the inner housing 118.

Referring again to FIG. 1, the inner housing 118 includes a user controllable switch or switch mechanism 132 and an enclosure 134. The inner housing 118 can be formed of plastic or any other rigid formable material, and can be sized to be received and removably maintained in the recess 126 formed in the outer housing 116. In the illustrated example, the enclosure 134 is rectangular. The user controllable switch mechanism 132 can include a front planar face 136 extending to a periphery of the recess 126 formed in the outer housing 116 when the inner housing 118 is received and removably maintained in the outer housing 116. The front planar face 136 can define an outer perimeter edge 138 of the inner housing 118 and be formed as a front surface of the inner housing 118.

The front planar face 136 can be a user controllable switch cover. In the illustrated example of the user controllable switch 132, the front planar face 136 is in the form of a two-way rocker switch such that the front planar face 136 is formed in a rectangular shape that is entirely a user interface for the two-way rocker switch. Accordingly, during operation a user can actuate the two-way rocker switch by applying pressure to either end of the front planar face 136. Such pressure can be applied while the inner housing 118 is mounted in the outer housing 116, or when the inner housing 118 is in a hand of a user.

Since the inner housing 118 is removable from the recess 126 of the outer housing 116, the user controllable switch 132 can be operated by a user while installed and mounted in the recess 126. Alternatively, a user can use the inner housing 118 external to the outer housing as a remote control. Operation of the inner housing 118 as a remote control may be performed by removing the inner housing 118 from the recess 126, and, for example, maintaining the inner housing 118 in a hand of the user. In this situation, a user can actuate the user controllable switch 132 to transmit wireless signals from any of a variety of locations within wireless transmission range of the lighting controller 110. The front planar face 136 included in the user controllable switch 132 is moveable as a user controllable switching mechanism with respect to the enclosure 134 to generate wireless signals.

The enclosure 134 includes an opposing back surface that can be received in the recess 126. When the back surface of the enclosure 134 is received in the recess 126, the peripheral edge 138 of the front planar face 136 can extend to surround and enclose a portion of enclosure 134 such that at least a front surface of the front planar face 136 is positioned at least partially outside the outer housing 116 and is moveable with respect to the enclosure 134.

Figure 5:
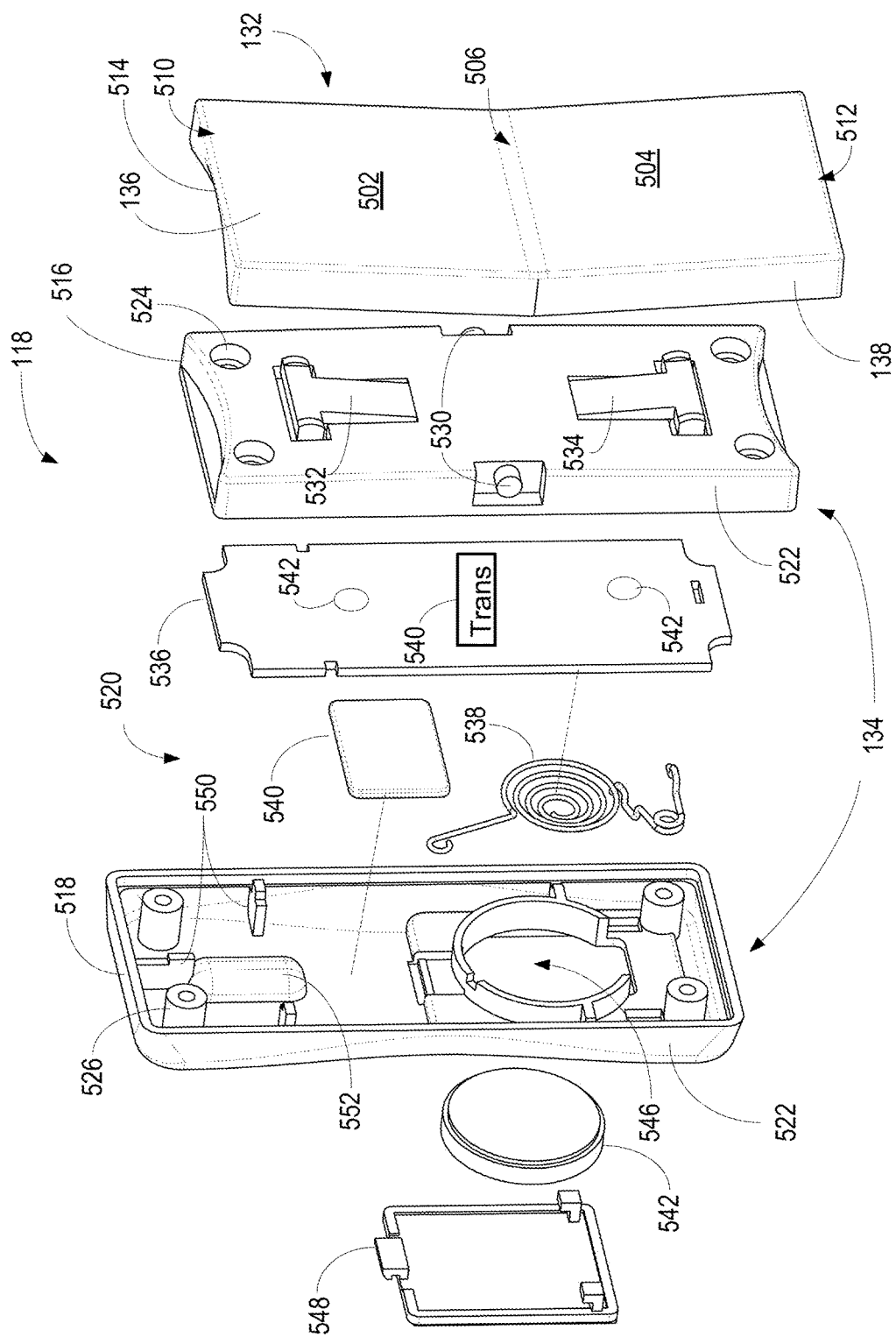
FIG. 5 is an exploded perspective view of an example of an inner housing of a wireless lighting control device.

FIG. 5 is a perspective exploded view of an example of the inner housing 118 which includes the user controllable switching mechanism 132 and the enclosure 134. In FIG. 5, user controllable switching mechanism 132 includes the front planar face 136, which is illustrated as part of a two-way rocker switch, and is formed as a unitary structure to include opposing inclined planes 502 and 504. The opposing inclined planes 502 and 504 each extend to a trough 506 centrally formed in the front planar face 136. In addition, each of inclined planes 502 and 504 extend upwardly and outwardly from the trough 506 to outer peripheral ends 510 and 512 of the front planar face 136 at the peripheral edge 138 of the front planar face 136.

At the opposing outer peripheral ends 510 and 512, the peripheral edge 138 includes an integrally formed shelf 514. The shelf 514 can facilitate manual removal by a user of the inner housing 118 from the recess 126 formed in the outer housing 116 by disengagement from a magnetic field formed therebetween. Since the front surface of the front planar face 136 is positioned at least partially outside the outer housing 116 when the inner housing 118 is positioned in the outer housing 116, the shelf 514 is accessible by a user as a lever point to remove the inner housing 118.

Figure 6:
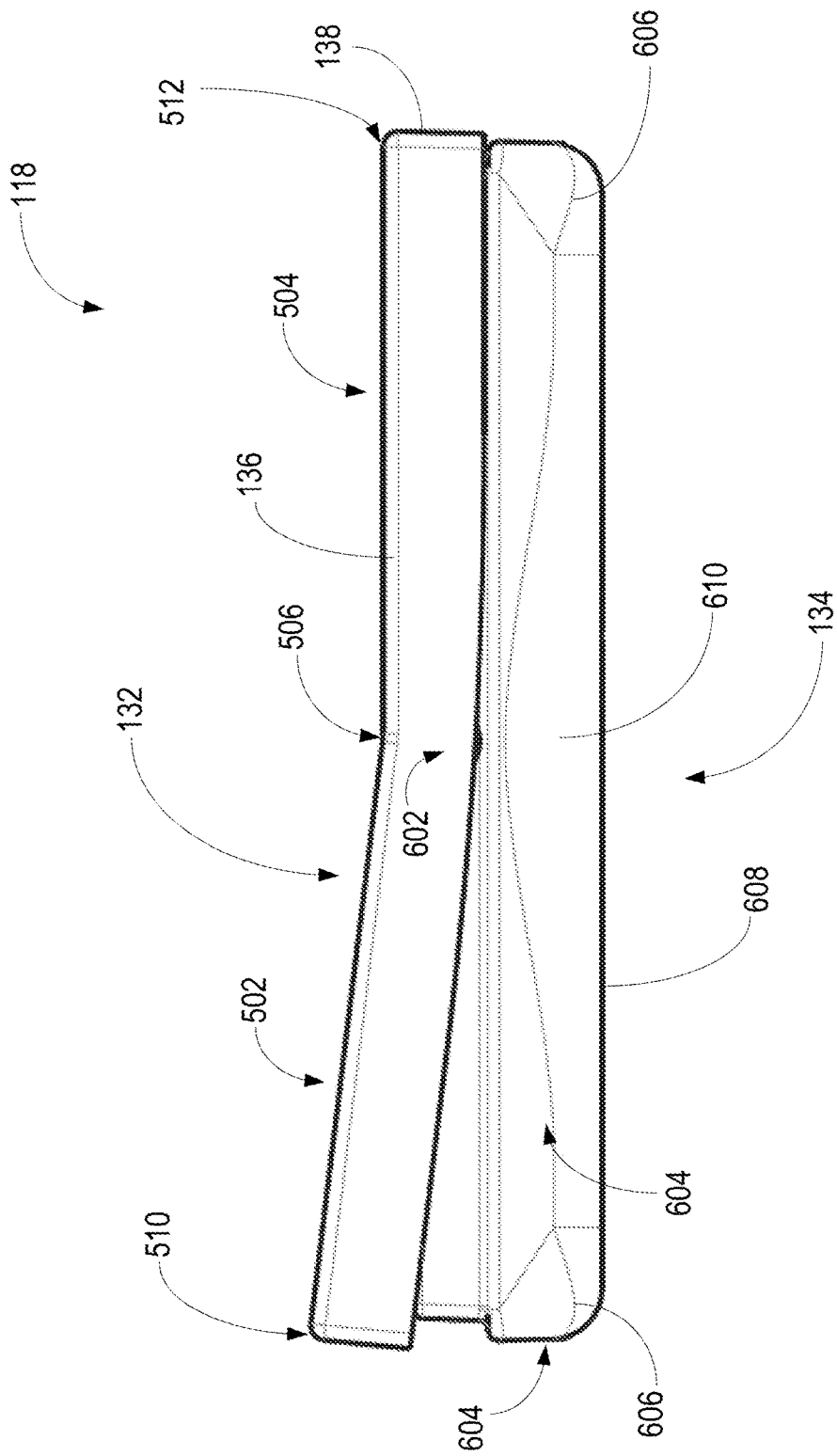
FIG. 6 is a side view of an example of an inner housing of a wireless lighting control device.

FIG. 6 is a side view of an example of the inner housing 118, which includes the user controllable switching mechanism 132 and the enclosure 134. In FIG. 6, the user controllable switching mechanism 132 is illustrated as including the front planar face 136, which is being pivoted about a pivot point 602 located at the trough 506 by moving the outer peripheral end 512 of the inclined plane 504 toward the enclosure 134. The outer peripheral end 510 of the inclined plane 502 is illustrated as being correspondingly moved away from the enclosure 134 due to the controllable switching mechanism 132 being a two-way rocker switch.

As also illustrated in FIG. 6, the outer peripheral edge 138 of the front planar face 136 extends over and surrounds a portion of the enclosure 134. As the front planar face 136 is pivoted, more or less of the portion of the enclosure is surrounded by the outer peripheral edge 138. Sides 604 of the enclosure 134 intersect to form rounded corners 606. A back surface 608 of the enclosure 134 forms a planar floor surface that extends to the sides 604 and the rounded corners 606 of the enclosure 134. The rounded corners 606 may be formed with a predetermined radius of curvature that corresponds to the radius of curvature of the corners 214 of the outer housing 116 (FIG. 2) so that the rounded corners 606 align with the corners 214 when the inner housing 118 is received in the recess 126 of the outer housing 116.

In addition, the sides 604 may include a depression 610 formed with a predetermined radius of curvature. The depression 610 may be formed in the sides 604 to facilitate grip and handling of the inner housing 118 when separated from the outer housing 116 and being used as a remote control in a hand of a user. The depression 610 may be formed with a radius of curvature that corresponds to the radius of curvature of the surface contour 216 included in the outer housing 116. Due to the correspondence between the rounded corners 606 and the corners 216, and between the depression 610 and the surface contours 216, the inner housing 118 fits snugly and securely in the outer housing 116 while still allowing ease of removal of the inner housing 118 from the outer housing 116 when use as a remote control is desired.

Referring again to FIG. 5, the enclosure 134 includes a cover 516 and a base 518 that can be coupled by a fastening mechanism, such as an adhesive or any form of mechanical fastener to form an enclosure cavity 520. The sides 604 of the enclosure 134 are formed by the combination of the base 518 and the cover 516. In the illustrated example, fasteners, such as screws, may extend through apertures 524 in the cover 516 to receivers 526 included in the base 518. The cover 516 includes ears 530, a first spring mechanism 532 and a second spring mechanism 534 included as part of the controllable switching mechanism 132. During operation, movement of the controllable switching mechanism 132 is effected by pivoting the front planar face 136 on the ears 530, and the front planar face 136 being returned to an equilibrium resting position by the respective first and second spring mechanisms 532 and 534. For example, when the second inclined plane 504 is moved toward the enclosure 134, as illustrated in FIG. 6, the second spring mechanism 534 will return the second inclined plane 504 to the rest position. The first and second spring mechanisms 532 and 534 are illustrated as flexible members, in other examples, other forms of spring mechanisms may be used.

Included in the enclosure cavity 520 is circuitry 536, a conductor 538 and a ferromagnetic member 540. In other examples, fewer or additional elements may be included in the enclosure cavity 520. The circuitry 536 may include wireless transmitter circuitry 540 and detection circuitry 542 that is included as part of the user controllable switch 132. In FIG. 5, the circuitry 536 is included on a circuit board, in other examples other forms of circuitry are possible. During operation, movement within the controllable switching mechanism 132 can be detected by the detection circuitry 542 and relayed to the wireless transmitter 540 for transmission as a wireless signal. The detection circuitry 542 includes a light control switch functionality.

In the illustrated example, the light control switch functionality includes a first contact closure 542A and a second contact closure 542B. The first and second contact closures 542A and 542B can be separately and independently manually actuated by a user. In an example operation, the previously discussed two-way rocker switch may be actuated by pivoting the front planar face 136 to separately initiate one of the first and second contact closures 542A and 542B. Upon receiving one of the first and second contact closures 542A and 542B, the detection circuitry 542 can initiate transmission of a corresponding wireless signal. Thus, the light control switch can provide detection and corresponding transmission of two different wireless signals such as raise and lower signals used to increase and decrease light intensity of one or more lighting fixtures.

The conductor 538 can be electrically coupled with the circuitry 536 to provide electrical power from a power storage device 542, such as a battery. The power storage device 542 may be mounted in the base 518 in a power storage device receptacle 546, behind an access door 548 detachably coupled to the base 518 and forming a portion of the back surface 608. The base 518 may also include one or more mounts 550 upon which the circuitry 536 can be positioned within the enclosure cavity 520.

The ferromagnetic member 540 can be fixedly mounted in the base 518, such as by adhesion, a fastener or friction fit. Alternatively, or in addition, ferromagnetic material may be included in the base 518, and/or the ferromagnetic member 540 may be molded within the base 518. The ferromagnetic member 540 can be any material, such as iron, nickel or cobalt, which is attracted to a magnetic field. Alternatively, or in addition, the ferromagnetic member 540 can be a permanent magnet that creates a magnetic field. The ferromagnetic member 540 can be used to magnetically couple the outer housing 116 and the inner housing 118 based on magnetic attraction between the ferromagnetic member 540 and the ferromagnetic member 312 included in the outer housing 116.

The base 518 can also include one of a lug and a keeper 552. In the example of FIGS. 2 and 5, a keeper 552 is illustrated that is integrally formed in the base 518 to receive and engage the lug 210 included in the floor 212 of the outer housing 116. Alternatively, the inner housing 118 can include a lug 552, and the outer housing 116 can include a keeper 210 formed to receive and engage the lug 552. The base 518 can be formed to integrally include either one of a lug or a keeper 552 so as to align the floor 212 of the recess 126 included in the outer housing 116 in parallel with the back surface 608. Accordingly, the floor 212 of the recess 126 includes the other of the lug or the keeper 210 integrally formed in the floor 212 of the outer housing 116.

Figure 7:
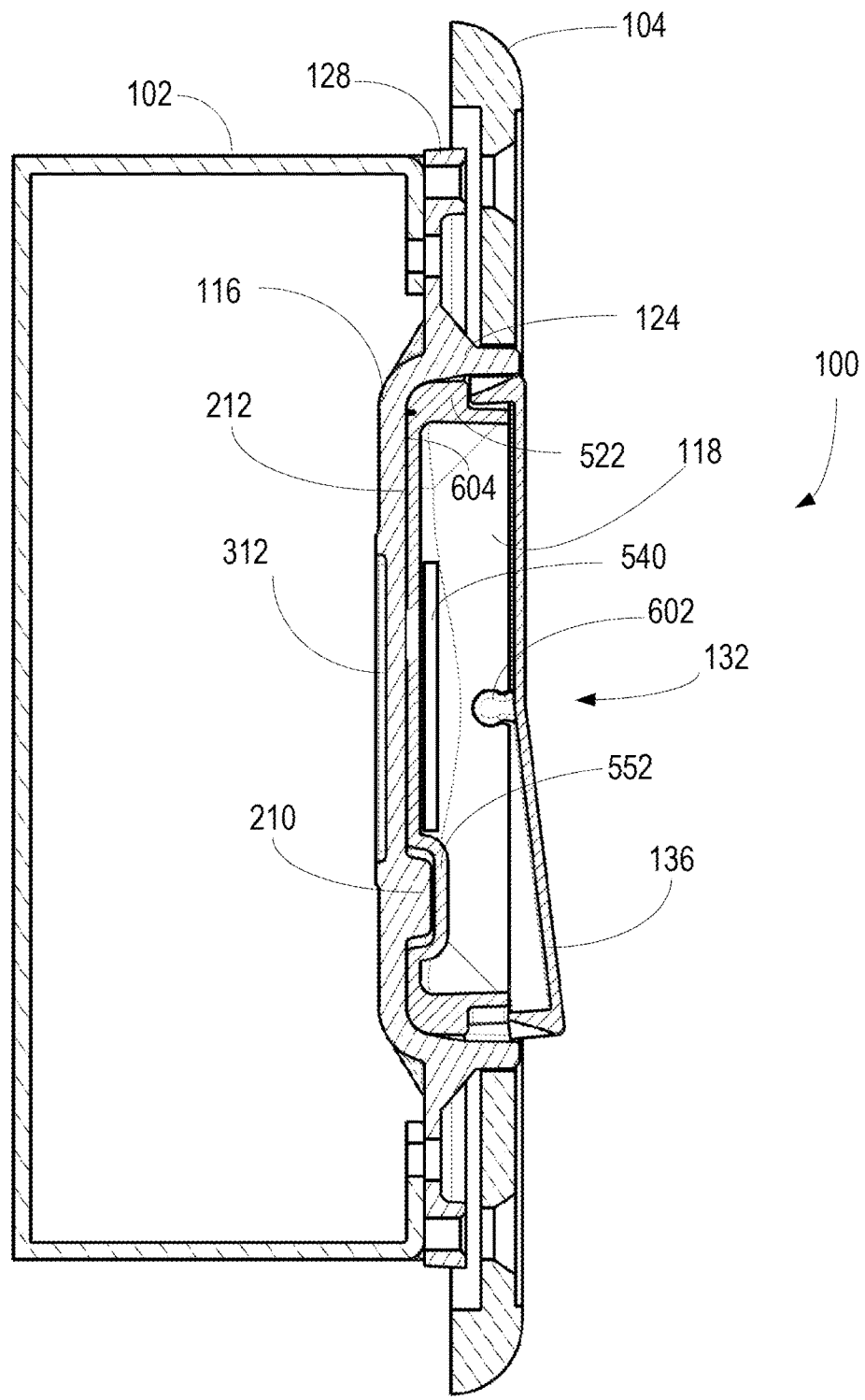
FIG. 7 is a cutaway side view of an example of a wall box, a mounting plate and a wireless lighting control device.

FIG. 7 is a cutaway side view of an example of the wireless lighting control device 106 mounted in a wall box 102 using a cover plate 104. In FIG. 7, with reference to FIGS. 1-6, the inner housing 118 is received in the recess 212 formed in the outer housing 116. Since the lug 210, integrally formed in the outer housing 116, has engaged the keeper 552, integrally formed in the inner housing 118, the back surface 608 of the inner housing 118 is contiguously aligned in parallel with the floor 212, and the sides 604 of the inner housing 118 are aligned in parallel with the walls 122 and 124 upon the inner housing 118 being received and maintained in the aperture 126 formed in the outer housing 116.

The inner housing 118 is configured to contiguously align with the floor 212 included in the outer housing 116 and be surrounded by the walls 122 and 124 upon receipt in the recess 126 formed in the outer housing 116. The inner housing 118 is received and removably maintained in the recess by alignment of the first and second ferromagnetic materials only when the floor of the inner housing and the floor of the outer housing are aligned in parallel by the lug 210 being engaged with the keeper 552. In some examples, only one alignment position of the inner housing 118 with respect to the outer housing 116 magnetically holds the inner housing 118 in a predetermined removable position in the outer housing 116. The only one alignment position can be dictated by engagement of the lug 201 with the keeper 552.

The user controllable switch mechanism 132 and a ferromagnetic material, such as the ferromagnetic member 540 can be included in the inner housing 118, and a ferromagnetic material such as the ferromagnetic member 312 can be included in the outer housing 116. At least one of the ferromagnetic member 312 and the ferromagnetic member 540 is a permanent magnet. Thus, the inner housing 118 is removably maintained in the recess 126 formed in the outer housing 116 by magnetic attraction between the ferromagnetic member 312 and the ferromagnetic member 540.

Accordingly, it is now apparent that there are many advantages of the invention provided herein. In addition to the advantages that have been described, it is also possible that there are still other advantages that are not currently recognized but which may become apparent at a later time.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to embrace them.

We claim:

1. A wireless lighting control device, comprising:
    an outer housing formed with a plurality of intersecting walls to define a recess and including a first ferromagnetic material, the outer housing configured to be coupled with an external structure by a plurality of mounting brackets integrally formed as part of the outer housing and extending outwardly therefrom;
    an inner housing comprising a user controllable switch mechanism and a second ferromagnetic material, wherein at least one of the first ferromagnetic material and the second ferromagnetic material comprises a permanent magnet, and the inner housing is sized to be received and removably maintained in the recess formed in the outer housing by magnetic attraction between the first ferromagnetic material and the second ferromagnetic material; and
    wherein a planar floor surface of one of the outer housing or the inner housing includes an integrally formed lug, and an other of the planar floor surface of the outer housing or the inner housing includes an integrally formed keeper sized to receive and engage the lug, wherein the inner housing is received and removably maintained in the recess in only a single orientation as a result of the lug being engaged with the keeper.

2. The wireless lighting control device of claim 1, wherein the inner housing is received and removably maintained in the recess by alignment of the first and second ferromagnetic materials only when the planar floor surface of the inner housing and the planar floor surface of the outer housing are aligned in parallel by the lug being engaged with the keeper.

3. The wireless lighting control device of claim 1, wherein the user controllable switch mechanism includes a moveable front planar face, the moveable front planar face extending to a periphery of the recess formed in the outer housing when the inner housing is received and removably maintained in the outer housing, the moveable front planar face being a user interface and defining an outer perimeter edge of the inner housing.

4. The wireless lighting control device of claim 1, wherein the inner housing includes a front surface entirely formed by a single two-way rocker switch.

5. The wireless lighting control device of claim 4, wherein the front surface is formed in a rectangular shape that is entirely a user interface of the two-way rocker switch.

6. The wireless lighting control device of claim 4, wherein the two-way rocker switch includes a shelf integrally formed at opposing peripheral ends of the two-way rocker switch to facilitate manual removal of the inner housing from the outer housing by disengagement from a magnetic field formed between the first and the second ferromagnetic materials.

7. The wireless lighting control device of claim 1, wherein the user controllable switch mechanism includes a two-way rocker switch formed as opposing inclined planes that extend to meet at a trough centrally formed in the two-way rocker switch, and also extend to opposing outer peripheral edges of the inner housing.

8. The wireless lighting control device of claim 7, wherein the two-way rocker switch forms a moveable cover on the inner housing that is pivotally mounted to an enclosure included in the inner housing at a pivot point formed at the trough, wherein the enclosure includes the second ferromagnetic material.

9. The wireless lighting control device of claim 1, wherein the outer housing includes a floor and the plurality of intersecting walls are formed around a perimeter of the floor to define the recess, the inner housing is configured to contiguously align with the floor and be surrounded by the intersecting walls upon receipt in the recess.

10. The wireless lighting control device of claim 1, wherein the inner housing includes a front surface which is moveable as part of the user controllable switching mechanism, and an enclosure formed to include an opposing back surface received in the recess, the front surface including a peripheral edge that extends to surround and enclose a portion of the enclosure such that the front surface is positioned at least partially outside the outer housing and is moveable with respect to the enclosure.

11. The wireless lighting control device of claim 1, wherein the user controllable switching mechanism comprises a plurality of separately actuated momentary contacts, a wireless transmitter and a power storage device.

12. The wireless lighting control device of claim 1, wherein the mounting brackets are formed at opposing ends of the outer housing on a central axis of the outer housing and are centrally positioned on at least some of the plurality of intersecting walls to extend therefrom.

13. A wireless lighting control device comprising:
    an inner housing comprising an enclosure forming a back and a plurality of sides of the inner housing, the enclosure including a wireless transmitter and a light control switch;
    an outer housing comprising a floor and a plurality of intersecting walls forming an aperture to receive the inner housing such that the back and sides of the inner housing are positioned within the outer housing in respective alignment with the floor and walls, and the front surface of the inner housing protrudes to extend outwardly from the aperture away from the outer housing;

a permanent magnet included in at least one of the inner housing or the outer housing;

a lug fixedly coupled to at least one of the floor of the outer housing or the back of the inner housing, and an other of the floor of the outer housing or the back of the inner housing includes a keeper sized to receive and engage the lug; and a ferromagnetic member included in at least one of the inner housing and the outer housing such that the permanent magnet or the permanent magnet and the ferromagnetic member attractively maintain the inner housing in the aperture and magnetically adhered to the outer housing only as a result of the lug being engaged with the keeper.

14. The wireless lighting control device of claim 13, wherein the ferromagnetic member is another permanent magnet.

15. The wireless lighting control device of claim 13, wherein the plurality of intersecting walls extend perpendicularly away from the floor such that the back of the inner housing is contiguously aligned in parallel with the floor, and the sides of the inner housing are aligned in parallel with the intersecting walls upon the inner housing being received and maintained in the aperture.

16. The wireless lighting control device of claim 15, wherein the plurality of walls intersect to form a corner having a predetermined radius of curvature, and the sides of the inner housing intersect to form a rounded corner having the predetermined radius of curvature to align with the corner.

17. The wireless lighting control device of claim 13, wherein the outer housing includes a plurality of mounting brackets integrally formed in at least some of the walls as part of the outer housing and extending outwardly therefrom.

18. A wireless lighting control device comprising:

an inner housing;

an outer housing comprising a first ferromagnetic member, a floor, a first pair of opposed perimeter walls extending perpendicular to the floor, and a second pair of opposed perimeter walls extending perpendicular to the floor, the first pair of perimeter walls intersecting the second pair of perimeter walls perpendicularly to define a rectangular cavity having a plurality of corners formed by the first and second pairs of perimeter walls and the floor, each of the corners having a predetermined radius of curvature;

the inner housing including a rectangular enclosure and a user controllable switch cover, the rectangular enclosure including a second ferromagnetic member, at least one of the first and second ferromagnetic members being a permanent magnet, and the rectangular enclosure being formed with rounded corners having the predetermined radius of curvature such that the rounded corners of the inner housing are alignable in the rectangular cavity with the corners of the outer housing and magnetically held in a predetermined removable position by the first and second ferromagnetic members; and a shelf integrally formed at opposing peripheral ends of the user controllable switch cover to facilitate manual removal of the rectangular enclosure from the outer housing.

19. The wireless lighting control device of claim 18, wherein one of the floor or the rectangular enclosure includes a lug, and the other of the floor or the rectangular enclosure includes a keeper sized to receive and engage the lug, and wherein the lug allows only one alignment position.

20. The wireless lighting control device of claim 18, wherein the user controllable switch cover comprises a centrally formed trough positioned nearest the rectangular enclosure, a first inclined planar surface extending away from the trough in a first direction to an outer perimeter of the user controllable switch cover, and a second inclined planar surface extending a second direction opposite to the first direction, the second inclined planar surface extending to the outer perimeter of the user controllable switch cover, to form a gap between the outer perimeter of the user controllable switch cover and the rectangular enclosure.

21. The wireless lighting control device of claim 18, wherein the outer housing is a single unitary structure formed to include a plurality of mounting brackets extending outwardly from at least some of the walls of the outer housing, and the floor of the outer housing is formed to include an aperture, the aperture formed to receive the first ferromagnetic member.

* * * * *